Fig. 1

Dec. 15, 1942.    L. E. POOLE ET AL    2,305,273
MACHINE FOR MANUFACTURING DYNAMO ARMATURES
Filed Jan. 6, 1940    13 Sheets-Sheet 2

Fig. 2

INVENTORS
Lora E. Poole and Ernest R. Fausset
BY
Spencer, Hardman & Fehr
their ATTORNEYS Dec. 15, 1942.   L. E. POOLE ET AL   2,305,273
MACHINE FOR MANUFACTURING DYNAMO ARMATURES
Filed Jan. 6, 1940   13 Sheets-Sheet 3

Fig. 3

INVENTORS
Lora E. Poole and Ernest R. Faunce
BY
Spencer Hardman & Fehr
their ATTORNEYS Dec. 15, 1942.   L. E. POOLE ET AL   2,305,273
MACHINE FOR MANUFACTURING DYNAMO ARMATURES
Filed Jan. 6, 1940   13 Sheets-Sheet 5

Dec. 15, 1942.   L. E. POOLE ET AL   2,305,273
MACHINE FOR MANUFACTURING DYNAMO ARMATURES
Filed Jan. 6, 1940   13 Sheets-Sheet 6

INVENTORS
Lora E. Poole and Ernest R. Fausset
BY
Spencer Hardman and Fehr
their ATTORNEYS Dec. 15, 1942. L. E. POOLE ET AL 2,305,273
MACHINE FOR MANUFACTURING DYNAMO ARMATURES
Filed Jan. 6, 1940 13 Sheets-Sheet 7

Dec. 15, 1942.   L. E. POOLE ET AL   2,305,273
MACHINE FOR MANUFACTURING DYNAMO ARMATURES
Filed Jan. 6, 1940   13 Sheets-Sheet 10

Fig. 24

Dec. 15, 1942. L. E. POOLE ET AL 2,305,273
MACHINE FOR MANUFACTURING DYNAMO ARMATURES
Filed Jan. 6, 1940 13 Sheets-Sheet 13

INVENTOR
Lora E. Poole and Ernest R. Fausset
BY
Spencer Hardman & Fehr
their ATTORNEYS Patented Dec. 15, 1942

2,305,273

UNITED STATES PATENT OFFICE 2,305,273

MACHINE FOR MANUFACTURING DYNAMO ARMATURES

Lora E. Poole and Ernest R. Fausset, Anderson, Ind., assignors to General Motors Corporation, Detroit, Mich., a corporation of Delaware Application January 6, 1940, Serial No. 312,796

4 Claims. (Cl. 29—84)

This invention relates to the manufacture of armatures for dynamo electric machines and more particularly to that step in the manufacture of armatures which follows the step of assembling windings with a slotted armature core. It has been the practice to force into the slots of the core and upon the windings therein strips of insulating material for the purpose of confining the windings within the slots against the action of centrifugal force. Such strips of insulating material have been cut from sheet insulating material, or from rope of twisted fiber or paper. In the case of sheet insulating material it has been the practice to use a machine which cuts the strips and applies them to the slots of the armature core. When fiber or paper rope is used this material is supplied on reels and is fed by the machine to a position radially opposite an armature slot. The machine includes a mechanism for cutting off the desired length of rope and inserting it between the core teeth.

The present invention contemplates the use of folded strips of insulating material such as paper which is relatively tough and somewhat resilient. This paper is folded in such manner as to provide a body which is oblong in cross-section so that it can be passed in the direction of its longer cross-sectional dimension between adjacent core teeth defining the throat of a winding slot. The strip is so folded that, after having passed the throat of the slot, it is permitted to expand and fill up that portion of the slot immediately inside of the throat and thus take a shape by increasing its bulk which enables it to resist centrifugal force acting upon the strip and the windings. In the copending application of Lora E. Poole S. N. 173,812, filed November 10, 1937, patented June 25, 1940, Patent No. 2,205,-822, there is disclosed a method of folding a strip of insulating paper in this manner and of assembling the length of such folded material with a wound armature.

It is the aim and object of the present invention to provide in a single machine means for folding a strip of paper unwound from a supply roll, in the manner disclosed in said Poole application, and for feeding the folded material to a location adjacent the core slot, the paper being located with its longer cross-sectional dimension extending radially of the armature core, means for compressing the strip in the direction of its shorter cross sectional dimension, and means for severing a required length of folded material from the remaining portion of folded material being supplied by the use of a shear blade moving radially of the armature while the strip is being compressed, and means for inserting the strip into the slot, and means for indexing the core into various strip-assembling positions.

The present invention contemplates the application of insulating strips into an armature which has had its core slots lined with insulating material previous to the application of windings thereto. This insulating material may be in the form of a continuous strip which not only lines the slots but also covers the periphery of the core teeth.

It is a further object of the present invention to provide the machine, which folds the insulating material and inserts it into the slots, with additional means for partially severing the slot lining insulation at the edges of the core teeth so that, after the armature has been operated upon by the machine, the strips of insulation overlying the periphery of the core teeth may be quickly removed by passing the armature between rotating wire brushes.

Further objects and advantages of the present invention will be apparent from the following description, reference being had to the accompanying drawings wherein a preferred embodiment of the present invention is clearly shown.

In the drawings:

Fig. 18 shows the strip inserting blade fully advanced into an armature slot, and it shows the clutch control mechanism in the position just before the machine comes into "home" position.

General construction and power drive

Figure 1:
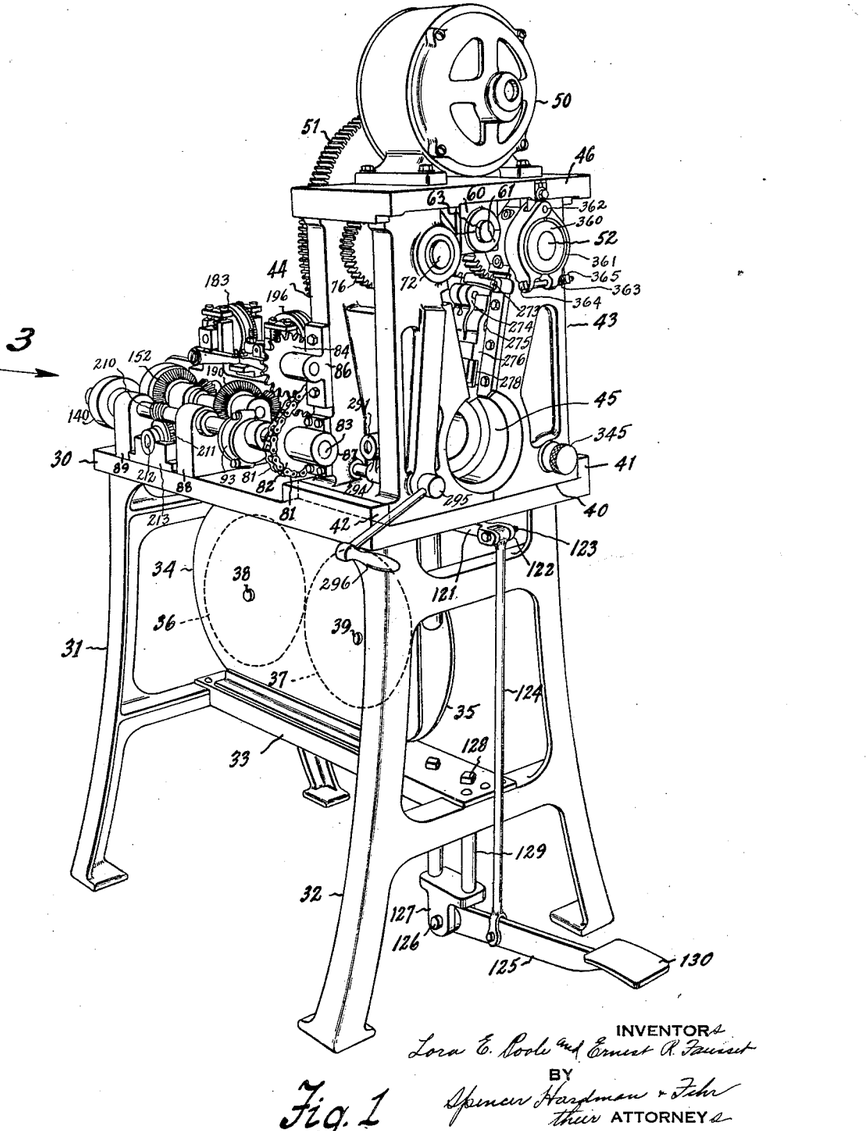
Fig. 1 is a perspective view showing the front and lefthand side of a machine embodying the present invention.

Referring now to Fig. 1 which shows a general perspective view of the machine, 30 designates a machine base or table supported by legs 31 and 32 tied together by cross bar 33 with support plates 34 and 35 between which there are supported two paper supply reels 36 and 37 mounted on pivot rods 38 and 39, respectively.

Figure 21:
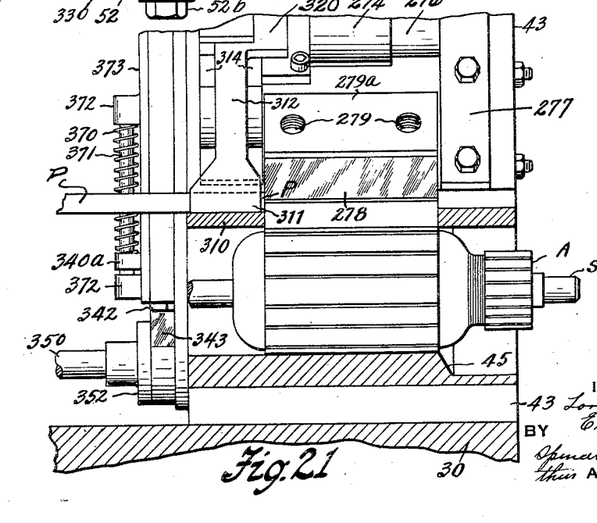
Fig. 21 is a view similar to Fig. 20 but showing a side view of a portion of the clutch control mechanism.

The base 30 is provided with a wide groove or recess at 40 located between two side flanges 41 and 42. The recess 40 receives pedestal frames 43 and 44 which together cooperate to provide a cylindrical chamber for receiving and supporting an armature indicated at A in Figs. 21 and 24. The pedestals 43 and 44 support a mechanism, to be described later, for severing lengths of folded insulation material and for inserting such lengths into the core slots of an armature, said armature being indexed or intermittently rotated to bring its slots successively into strip receiving position. The pedestals 43 and 44 support a platform 46 which provides a tie for the upper ends of the pedestals. Platform 46 supports an electric motor 50 which provides the sole source of power for the machine. Upon the shaft of motor 50 is mounted a small gear, not shown, which meshes with a gear 51 which is mounted upon a crank shaft 52 and which is connected with said shaft by means of a clutch designated in its entirety by C, details of which will be described later.

Figure 22:
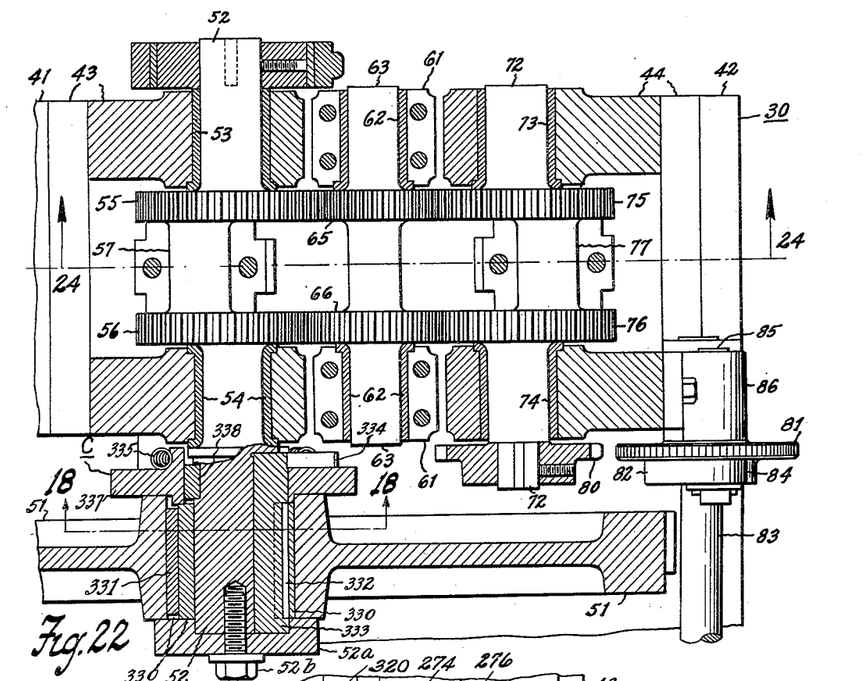
Fig. 22 is a sectional view on line 22—22 of Fig. 18.

Referring to Fig. 22, the shaft 52 is journalled in bearings 53 and 54 provided by the pedestal 43. Shaft 52 is provided with gear portions 55 and 56 joined by crank arm portion 57. The platform 46 provides bearing brackets 60 which cooperate with bearing caps 61 to support bearings 62 for an idler shaft 63 carrying gears 65 and 66 which mesh respectively with gears 55 and 56 of the shaft 52. Pedestal 44 provides bearings 73 and 74 for a crank shaft 72 providing gears 75 and 76 which mesh respectively with gears 65 and 66 which are joined by a crank arm 77. It will be described later that the crank arms 57 and 77 operate the mechanism for shearing a predetermined length of folded insulating material from the supply strip of the same and inserting the lengths successively into the armature core slots, and the mechanism for partly shearing away the peripheral insulation of the core.

Shaft 72 carries a sprocket gear 80 connected by a chain 81 with a similar sprocket gear 82 fixed to a shaft 83. Chain 81 passes partly around an idler sprocket gear 84 mounted on a stub shaft 85 carried by a bracket 86 attached to the pedestal 44. Shaft 83 is journaled in a bearing bracket 87 attached to the pedestal 44 and in bearing brackets 88 and 89 provided by base 30.

Armature indexing mechanism

Figure 5:
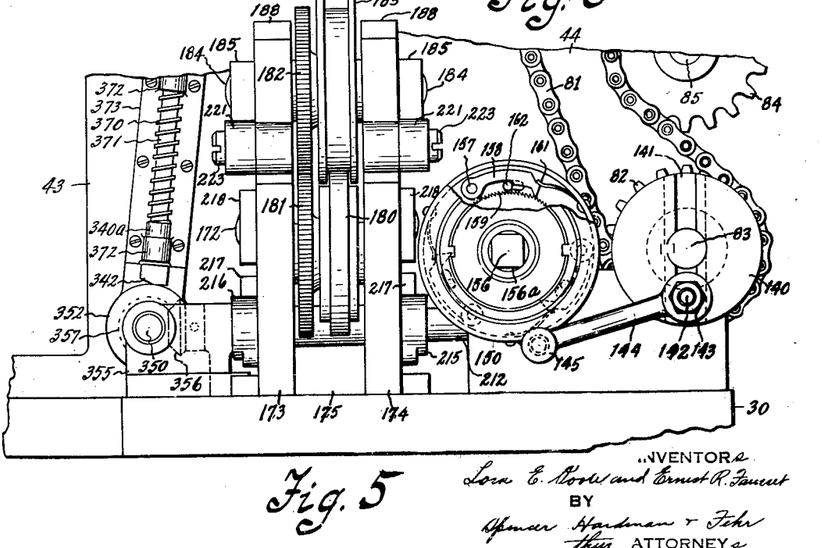
Fig. 5 is an end view on the line 5—5 of Fig. 4.
Figure 8:
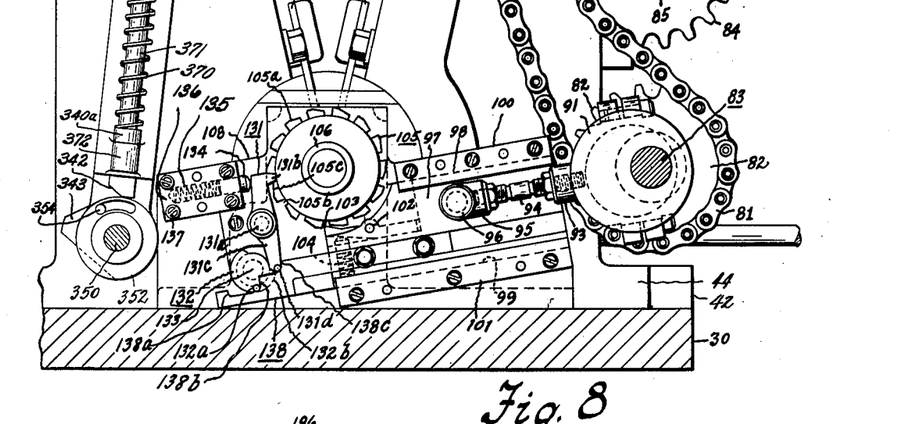
Fig. 8 is a sectional view on the line 8—8 of Fig. 4.
Figures 9, 10, 11, 12, 13, 14, 15, 16:
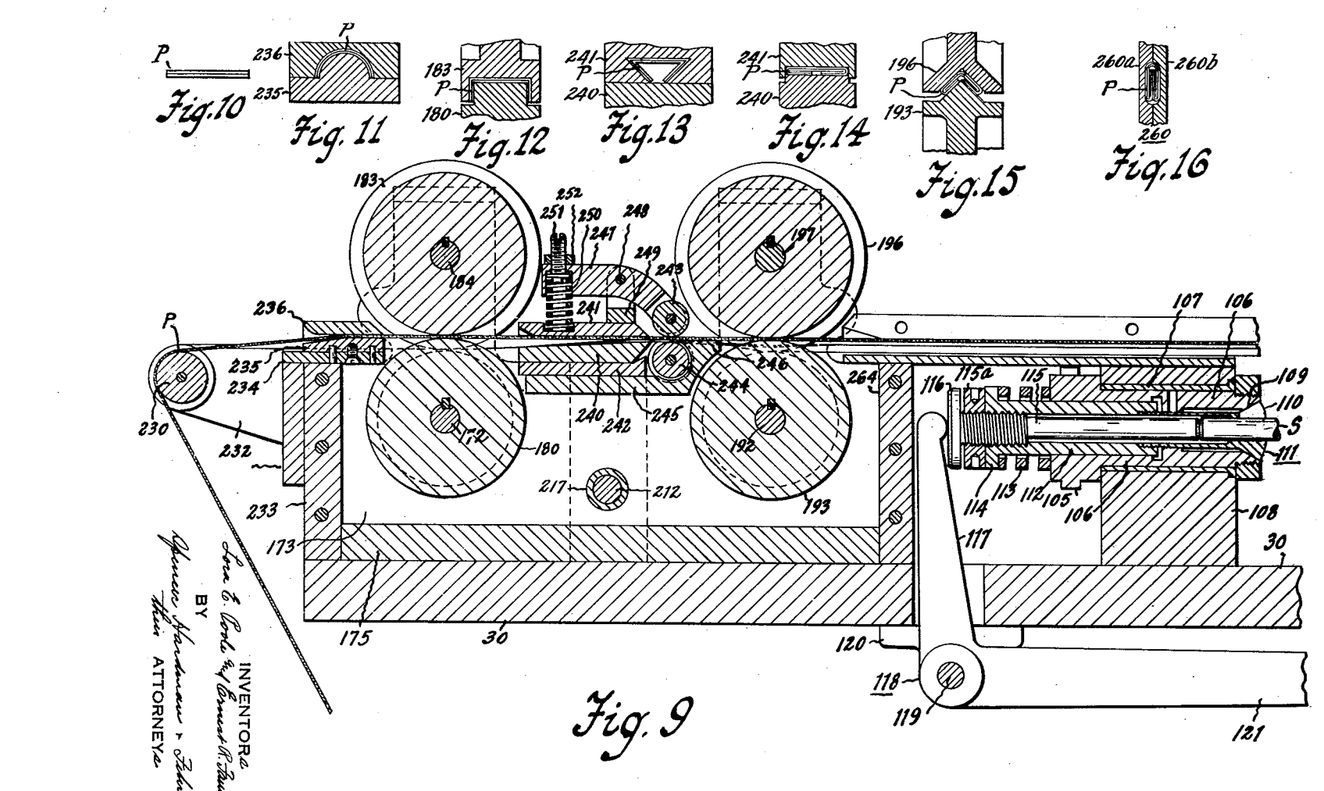
Fig. 9 is a sectional view on the line 9—9 of Fig. 4.
Figs. 10, 11, 12, 13, 14, 15 and 16 are sectional views of the insulating material at various stages of formation starting with the flat stage at Fig. 10 and ending with the folded stage in Fig. 16.
Figure 17:
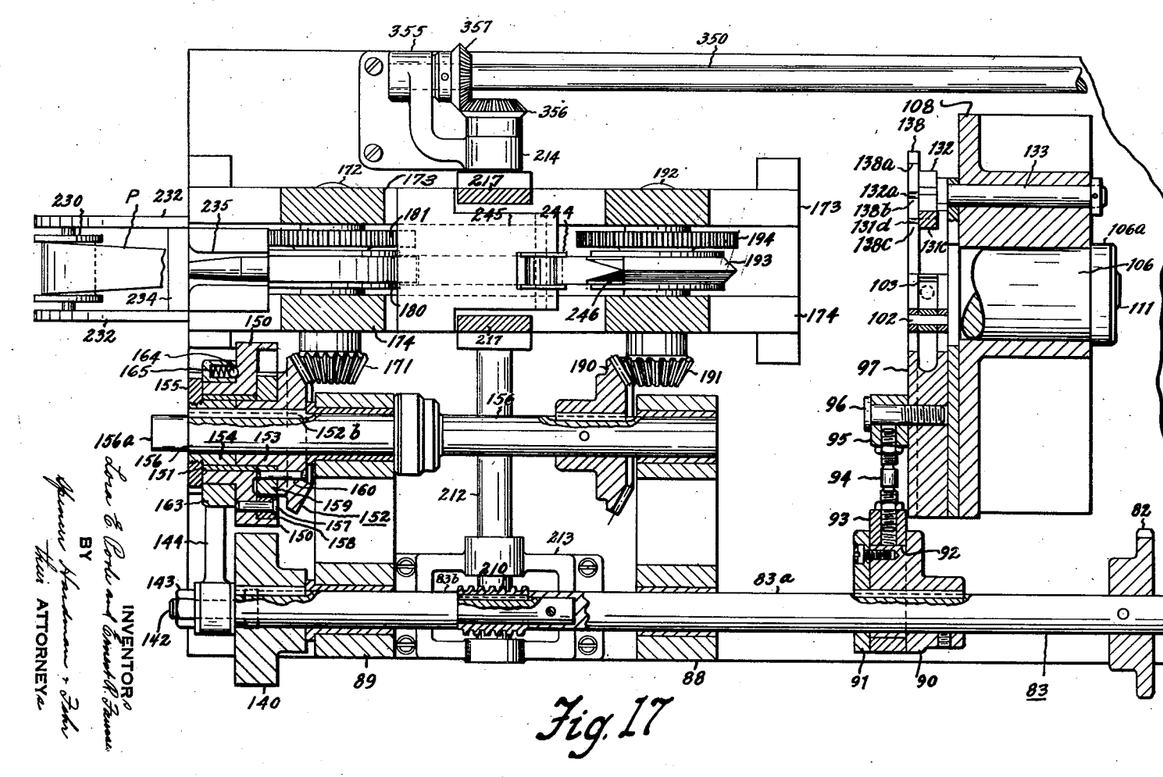
Fig. 17 is a sectional view on the line 17—17 of Fig. 5.

Referring to Figs. 5, 8 and 17, to shaft 83 there are keyed a main eccentric member 90 and eccentric cap member 91 providing a groove 92 eccentric to shaft 83. The groove 92 receives an eccentric strap 93 connected with an adjustable link or turnbuckle 94 having screw threads at its opposite ends of opposite pitch, as shown in Figs. 8 and 17. Adjustable link 94 is connected with a pivot block 95 which is attached by pivot pin 96 to a slide 97 guided by ways 98 and 99 and way cover plates 100 and 101 respectively. The slide 97 carries a pivot pin 102 which supports a pawl 103 urged by a spring 104 into engagement with a ratchet 105. Ratchet 105 is provided with a tubular shaft 106 (Fig. 9) journalled in a bearing 107 provided by a bearing bracket 108 supported by table 30. Shaft 106 is provided at its righthand end (Fig. 9) with a tapered counterbore 109 which cooperates with resilient arms 110 of a tri-furcated collet chuck sleeve 111, which is screwthreadedly attached to a sleeve 112 slidably associated with the tubular shaft 106. The sleeve 112 is urged toward the left by a heavy spring 113 located between the left end of shaft 106 and the head 114 of the sleeve 112. The function of the spring 113 is yieldably to urge the tri-furcated collet chuck element 111 against the right hand tapered counterbored end of the shaft 106 thereby causing the resilient elements 110 of said collet chuck member 111 to seize the shaft S of the armature assembly A shown in Fig. 24. The shaft 112 is screwthreadedly associated with a stop rod 115 engaged by an arm 117 of a bell crank lever 118 pivoted at 119 upon a bracket 120 suspended from the table 30 (Fig. 9). Lever 118 has an arm 121 which terminates in spaced ears 122 (Fig. 1) across which is located a pin 123 connected by a rod 124 with a pedal lever 125 pivoted upon a pin 126 carried by a bracket 127 suspended by bolts 128 from the cross bar 33, and spaced from the cross bar 33 by tubes 129 which surround the bolts 128. Pedal 125 includes a foot pad 130 by which the operator presses the lever 125 downwardly to effect clockwise rotation of the bell crank 118 and movement of the rod 115 toward the right to push the armature shaft loose from the collet chuck while at the same time relieving the seizing pressure of the collet chuck upon said shaft S. The righthand end of rod 115 provides a limiting stop for the shaft S. Rod 115 is adjustably secured to the sleeve 112 through its screw-thread connection and is locked in the desired position of longitudinal adjustment by a lock nut 115a. Since the rod 115 is adjustable, the machine may be readily adapted to accommodate armature assemblies having shafts S of varying lengths relative to the end laminations of the armature coil.

It will be understood that an armature assembly A is supported not only by the collet chuck shown in Fig. 9, but by the walls of the pedestals 43 and 41 which, as shown in Fig. 1, define the armature receiving recess 45.

Returning now to the further description of the indexing mechanism, it will be understood that rotation of the shaft 83 effects operation of the eccentric 90 to oscillate the strap 93 and reciprocation of the slide 97 and of the pawl 103 to effect intermittent rotation of the shaft 106. The mechanism for preventing the backing up of the ratchet 105 and for securing the proper location thereof after an intermittent movement of the shaft 106 will now be described particularly with reference to Fig. 8.

The bracket 108 carries a pivot stud 131a supporting a ratchet locking dog 131 having a tooth 131b which fits in accurately between the spaces of the teeth 105a of ratchet 105. Dog 131 is urged into this locking position by a plunger 134 urged by a spring 135, said plunger and spring being located within a guide block 136 attached by screws 137 to the bracket 108. The tooth 131b of the locking dog 131 is so shaped that it cannot be cammed out from the space between adjacent teeth 105, but must be positively retracted. Movement of the slide 97 is used positively to effect retraction of the dog tooth 131b from the ratchet 105. For this purpose the slide 97 is provided with an extension 138 having a notch defined by two side surfaces 138a and 138b. As shown in Fig. 8, the side surface 138b is engaged by a pin 132a carried by a cam 132 pivotally mounted at 133 upon the bracket 108. As the slide 97 and the extension 138 are moved to the right from the position shown in Fig. 8 the pin 132a is caught by the surface 138a and is caused to move toward the right, thereby causing the cam 132 to rotate counterclockwise and to cause its lobe 132b to engage a pin 131d on the dog 131 to move it toward the right thereby causing dog tooth 131b to be withdrawn from a tooth space 105b between teeth 105a. The point of the tooth 131b is retracted at least so far toward the left that it may be engaged by a beveled surface 105c of the immediately adjacent tooth 105a. At that time the pin 131d of dog 131 will ride upon the high part of the lobe 132b and will hold the dog 131 in the retracted position, so that intermittent movement of the ratchet 105 may take place when the slide 97 is moved from right toward left into the position shown. As the slide 97 approaches the position shown in Fig. 8 to complete an increment of rotation of the shaft 106, the notch surface 138b of the extension 138 will engage the pin 132a to cause the cam 132 to rotate clockwise and thereby remove the lobe 132b from engagement with the pin 131d so that the dog 131 may be restored to ratchet locating position. The dog 131 is restored to ratchet locating position not only by the spring actuated plunger 134, but also as the result of engagement of the pin 131d with a shoulder 138c provided by the slide extension 138. In this way the collet chuck locking dog 131 is positively retracted from engagement with the ratchet 105 in order that intermittent rotation of the ratchet may be effected by the pawl 103; and the dog 131 is positively restored to shaft locking position after the increment of rotary movement of the chuck has been effected.

*Paper folding and feeding mechanism*

Figure 4:
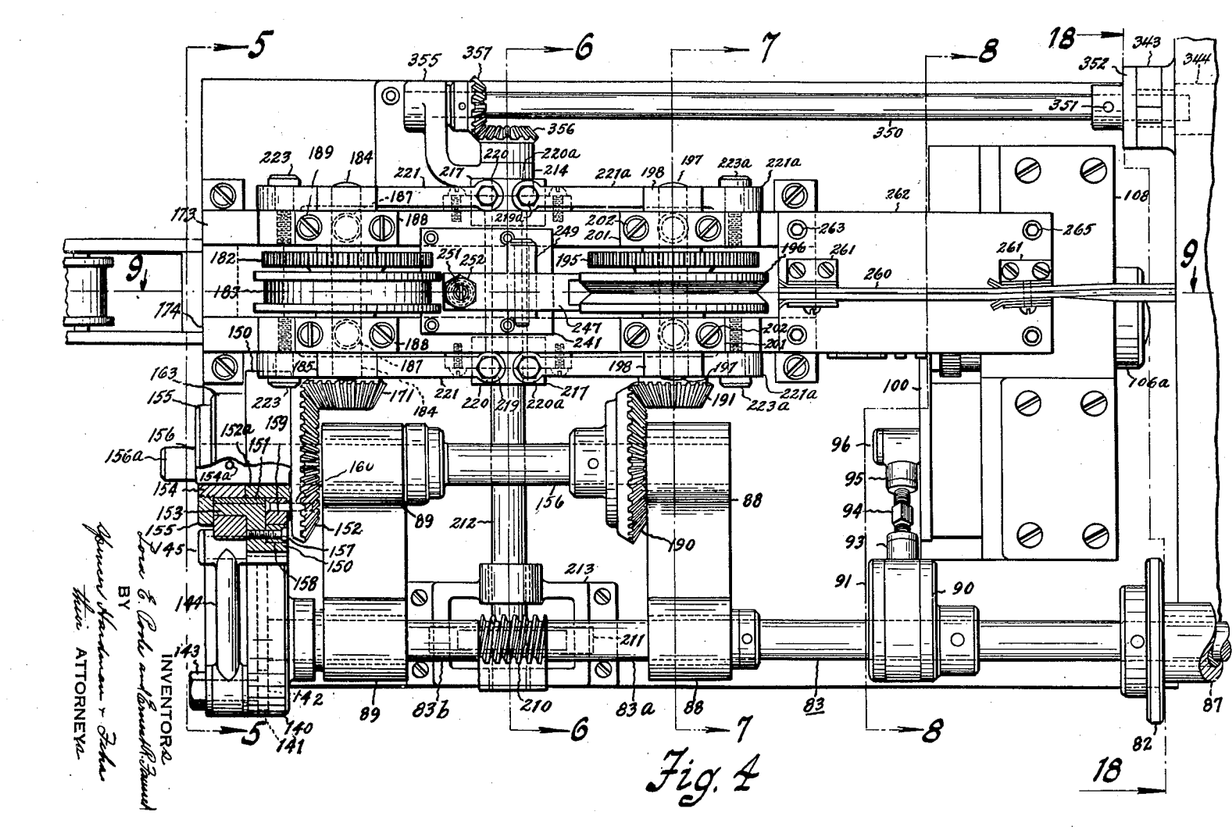
Fig. 4 is a fragmentary plan view.

Referring to Figs. 4, 5 and 17, shaft 83 drives a crank disc 140 having a cross T-slot 141 which receives an adjustable screw 142 having a T-head which is slidable through the slot 141 and is secured in the desired position by nut 143. The screw 142 provides a pivotal connection for a connecting rod 144 pivotally attached at 145 to a cup-shaped pawl carrier 150 the hub of which carries a press-fitted bearing 151 (Fig. 17) which is journalled on the hub 153 of a bevel gear 152 and also upon a collar 154, pinned at 154a (Fig. 4) upon a shaft 156. Pawl carrier 150 is threadedly engaged by screws 157 which provide pivots for three pawls 158 (Fig. 5) engageable with a ratchet 159 which is connected by pins 160 with the gear 152. Springs 161 yieldingly urge the pawls 158 against the ratchet 159. The pawls 158 may be lifted away from the ratchet 159 by lifter pins 162 carried by a lifter pin ring 163 journalled upon the hub 153 of the pawl carrier 150. A nut 155 threadedly engaging the collar 154 retains the pawl lifter pin carrier 163 and the pawl carrier 150 in position between the nut 155 and the ratchet 159. When it is desired to retract the pawls 158 from the ratchet 159, the operator turns the ring 163 clockwise as viewed in Fig. 5, thereby causing the pins 162 to cam the pawls 158 away from the ratchet 159. A detent ball 164, urged by a spring 165, yieldingly retains the ring 163 either in its pawl lifting position or in its non-pawl lifting position. When this adjustment has been made, then the shaft 156 may be turned manually by applying to its squared end 156a a suitable wrench or crank, not shown.

Figure 3:
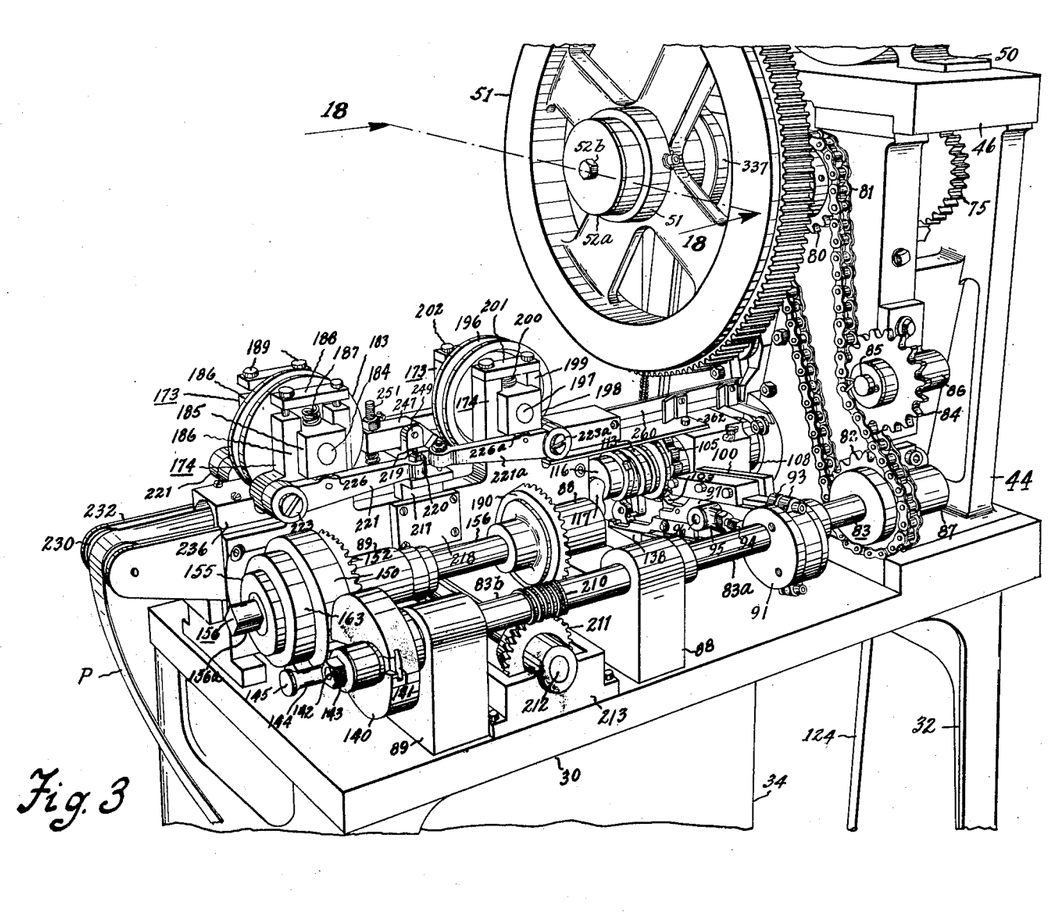
Fig. 3 is a perspective view looking approximately in the direction of the arrow 3 of Fig. 1 and showing principally the mechanism for folding the insulating material which provides the insulating strips for the armature core slots.

The shaft 156 is journalled in bearings provided by the brackets 88 and 89; and it is driven by the bevel gear 152 and it drives another bevel gear 190. Referring to Figs. 5, 9 and 17, the gear 152 drives a gear 171 which is mounted upon and drives a shaft 172 journalled in two plates 173 and 174 which extend vertically from a sub-base plate 176 resting upon the main base 30. Shaft 172 carries a forming roller 180 and a gear 181 which meshes with a gear 182 which drives a forming roller 183 keyed to a shaft 184. As shown best in Fig. 3, shaft 184 is rotatably supported by bearing blocks 185 slidable in ways 186 which are provided by the two plates 173 and 174. The blocks 185 are urged downwardly by spring 187s confined by plates 188 which are connected by screws 189 with the plates 173 and 174. The springs 187 yieldingly urge roller 183 toward the roller 181 in order that these rollers may grip strips of paper fed between them whereby the strips are propelled between rollers and are formed, while thus longitudinally moving into a certain shape incident to the complete formation or folding of the paper, as will be described later.

Figure 7:
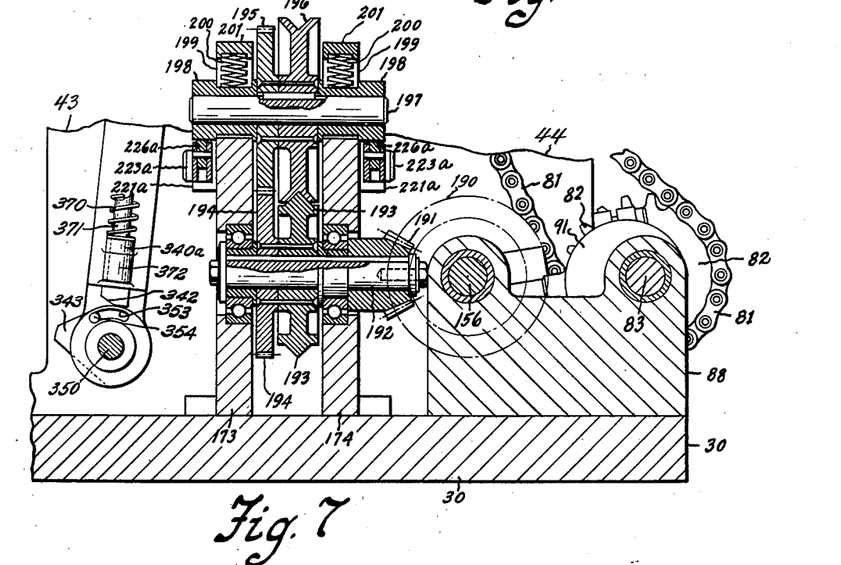
Fig. 7 is a sectional view on the line 7—7 of Fig. 4.

Referring to Figs. 7 and 17 the beveled gear 190 drives a smaller bevel gear 191 which drives a shaft 192 journalled in bearings provided by the two plates 173 and 174 and driving a forming roller 193 and a gear 194. Gear 194 drives a gear 195 which drives a forming roller 196 mounted on a shaft 197. Shaft 197 is journalled in bearing blocks 198 guided by ways 199 provided by the plates 173 and 174 (see also Fig. 3). The blocks 198 are urged downwardly by springs 200 confined by plates 201 attached to plates 173 and 174 by screws 202. The springs 200 yieldingly urge the roller 196 against the roller 193 in order to grip the paper and form it in accordance with one of the steps necessary to the formation of paper preparatory to its use as a staking member for assembly with a slotted armature core.

At a certain point in the cycle or operation of the machine to insert strips of folded papers in all of the slots of an armature core and also to partially break away the core insulation which envelops the core teeth, it is necessary to discontinue the feeding of paper to the mechanism which inserts paper strips in the armature core slots. To accomplish this, the feeding mechanism is momentarily disabled through the use of means which elevates the rollers 183 and 196 out of contact with the paper which passes between them and the rollers 180 and 193. This roller elevating mechanism will now be described.

Figure 6:
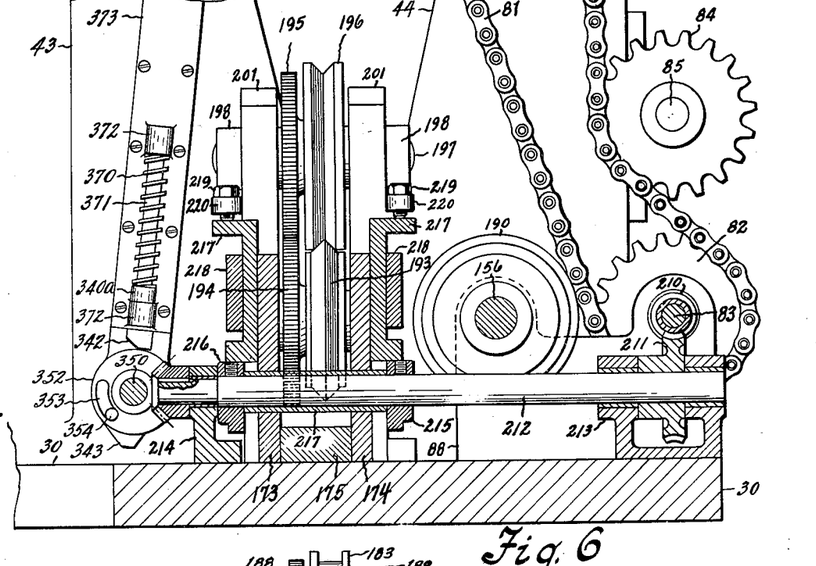
Fig. 6 is a sectional view on the line 6—6 of Fig. 4.

Referring to Figs. 4, 6 and 17, the shaft 83 provides a worm 210 located between its shaft sections 83a and 83b. Worm 210 drives a worm wheel 211 attached to a shaft 212 journalled in brackets 213 and 214 (Fig. 6). Shaft 212 carries cams 215 and 216 spaced by tube 217 which passes through the plates 173 and 174. Cams 215 and 216 cooperate with vertically movable slides 217 guided by plates 218 and engageable with stop screws 219 carried at the ends 220 of arms 221 pivoted upon pins 223 attached respectively to plates 174 and 173. Levers 221 are each provided with a roller or other wear piece 226 engageable with the under side of a bearing block 185. Obviously, upward movement of slides 217 will cause the levers 221 to move upwardly and thus elevate the blocks 185 and the shaft 184 and thus lift the forming roller 183 away from the paper and the forming roller 180.

By exactly similar means and in a similar manner, the slides 217 operate to elevate the bearing blocks 198, the shaft 197 and the forming roller 196 away from the forming roller 193. The parts which accomplish this have been given reference numerals similar to those which effect the elevation of the roller 183 but with the affix a.

The timing of the cams 215 and 216 with respect to other operating elements of the machine will be described fully later. For the present, it will suffice to state that the shaft 212 rotates once during each cycle of operation of the machine. Therefore once during each cycle of machine operation the cams 215 and 216 function to lift the forming rollers 183 and 196 out of engagement with the paper so that no feeding of paper takes place, although the rollers 180 and 193 may be rotating at that time.

Referring now to Figs. 10 to 16, inclusive, the paper P may be two ply as shown in these figures or single ply as shown in Fig. 9. The paper P is originally flat as it enters into engagement with a guide roller 230 pivotally supported by a bracket 232 attached to a cross plate 233 fixed to the side plates 173 and 174. The cross plate 233 supported a bracket 234 upon which are mounted forming plates 235 and 236 which change the piece of paper P from flat, as shown in Fig. 10, to inverted U-shape, as shown in Fig. 11. Then the paper passes between the forming rollers 180 and 183 which change its shape into the inverted channel shape as shown in Fig. 12. Then the paper passes between forming plates 240 and 241 which gradually change the shape of the paper from that shown in Fig. 12 to that shown in Fig. 14. An intermediate step is indicated by Fig. 13. The plates 240 and 241 are supported by a bracket 242 supported between the side plates 173 and 174. The paper then passes between the rollers 193 and 196 where it is formed into the shape shown in Fig. 15. As the paper passes from the plates 240 and 241 to the rollers 193 and 196, it is maintained in the condition shown in Fig. 14 by passing it between rollers 243 and 244. Rollers 244 is pivotally supported by a bracket 245 attached to the bracket 242. Bracket 245 is provided at the forward or righthand end with such shape as to start the paper into the condition in which it finally arrives as shown in Fig. 15. The roller 243 is pivotally supported by the bifurcated end of a lever 247 pivoted at 248 upon a bracket 249 carried by a plate 241. Lever 247 is urged clockwise by a spring 250 the compression of which is effected by an adjusting screw 251 screwthreadedly connected with the lever 247 and secured in the desired position of adjustment by a lock nut 252. After the paper has been formed, as shown in Fig. 15, it is formed into the shape shown in Fig. 16 by causing it to pass into the flared entrance of a tube 260 of oblong cross section and comprising sections 260a and 260b. This tube 260 is supported by brackets 261 upon a plate 262 secured by screws 263 to a cross plate 264 which is tied in between the righthand ends of the plates 173 and 174. The righthand end of the plate 262 is attached by screws 265 to the bracket 108 which supports the collet chuck for rotating the armature assembly. From the tube 260 the folded insulating material passes to the apparatus for severing it from the supply and inserting it into armature core slots.

*Strip severing and inserting mechanism*

Figure 24:
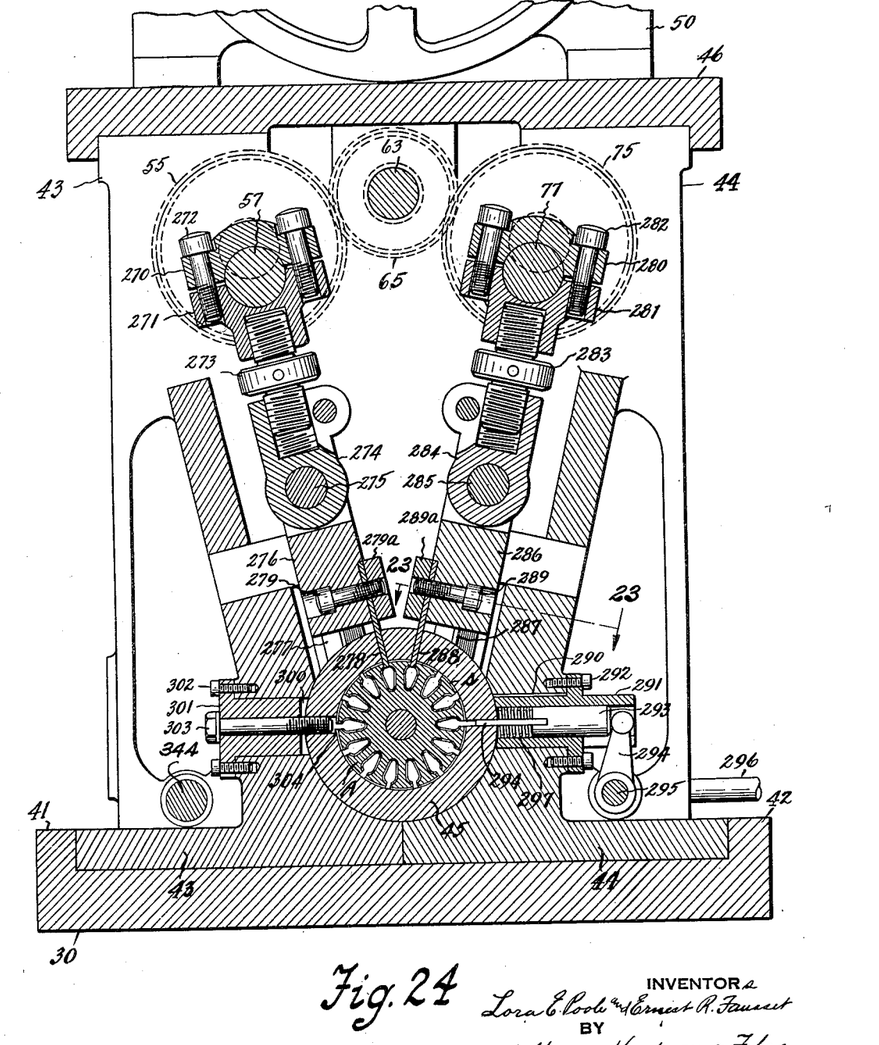
Fig. 24 is a sectional view on the line 24—24 of Fig. 22.

Referring to Fig. 24, the crank 57 is associated with a connecting rod comprising caps 270 and 271 secured by screws 272 and a turn-buckle 273 connected with a pivot block 274 journalled on a cross-pin 275 carried by a slide 276. Block 274 slides on ways 277 provided by the pedestal bracket 43. Sleeve 45 is provided with a slot which receives a blade 278 secured to the block 274 by screws 279 and a bar 279a. Similarly, the crank 77 is associated with a connecting rod comprising caps 280 and 281 fixed by screws 282 and a turnbuckle 283 connected with a pivot lock 284 journalled on cross pin 285 carried by a slide block 286 slidable in ways 287 provided by the pedestal 42. Sleeve 45 is provided with a slot for receiving a blade 288 secured to the slide 286 by screws 289 and a bar 289a. The cranks 57 and 77 are geared together so that the blades 278 and 288 are reciprocated concurrently into and out of the slots of the armature core A. The function of blade 278 is to sever lengths of strip material and force it into core slots. The function of blade 288 is to partly sever or break away the slot insulation S which surrounds the armature core teeth, so that, the portions of insulation located adjacent the core teeth peripheries may easily be removed by contact with a rotating wire brush.

Pedestal 44 is provided with an opening 290 for receiving a bushing or sleeve 291 attached to the pedestal 44 by screws 292. Bushing 291 guides a plunger 293 carrying a blade 294 extending through a slot in the sleeve 45. The plunger 293 is actuated toward the core by a lever 294 mounted on a shaft 295 and operated by a hand lever 296 against the action of a spring 297 which urges the plunger 293 against the arm 294. Blade 294 is received by a core slot to provide an initial location of the armature core before the armature shaft S is gripped by the collet chuck 111.

The pedestal 43 is provided with a side opening 300 which receives a bushing 301 secured by screws 302. Bushing 301 receives a screw 303 threadedly engaging a tapped hole 304 in the insert sleeve 45.

Figures 18, 23:
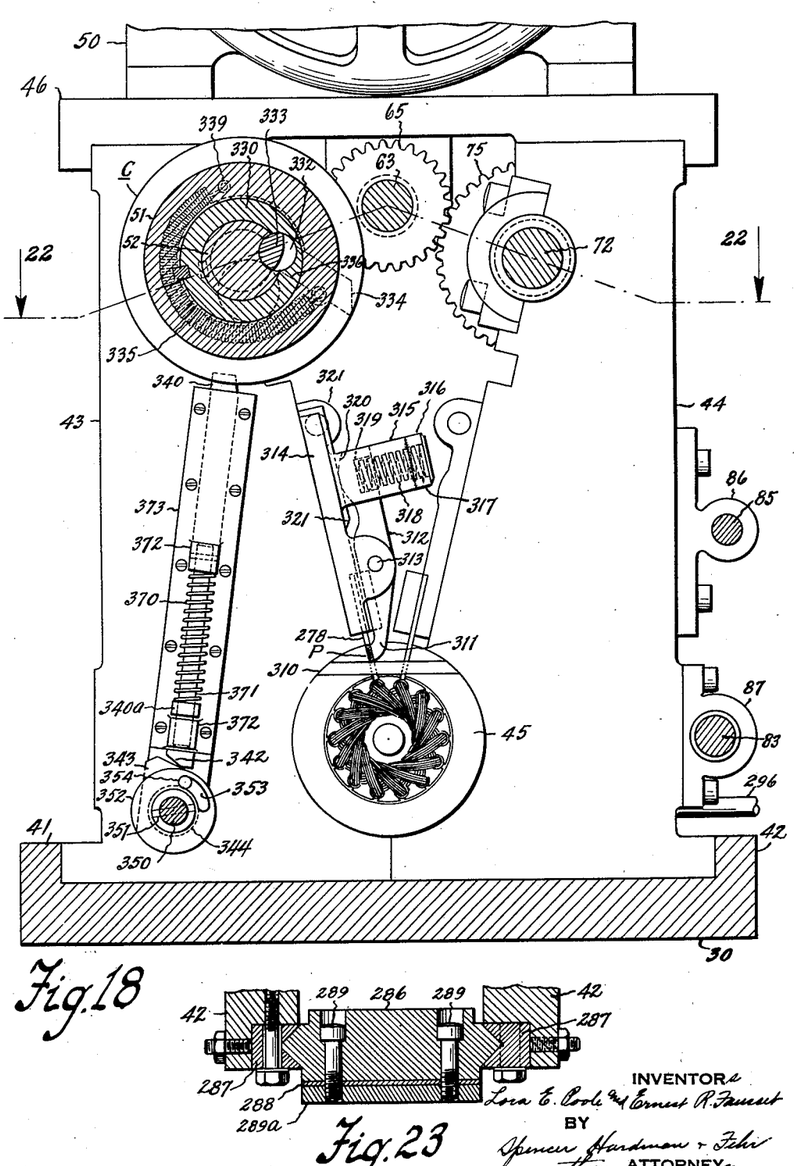
Fig. 18 is a fragmentary end elevation looking generally in the direction of arrow 18 of Fig. 3 and includes sectional views on the lines 18—18 of Figs. 4 and 22.
Fig. 23 which is on the same sheet with Fig. 18, is a sectional view on the line 23—23 of Fig. 24.

Referring to Fig. 18, the sleeve 45 is provided with a shear bar or stationary blade 310 which cooperates with the left hand edge of the blade 278 (see Fig. 1) to cut an insulating strip of folded paper from the supply strip P which is delivered by the guide 260 to the slot which receives the blade 278. As the blade 278 moves downwardly, it severs an insulation strip along the right hand edge of the shear bar 310 (see Fig. 21) and causes the severed strip to be inserted in an armature core slot in the manner shown in Figs. 25 and 26. Then the armature core A is indexed clockwise to bring a slot which has just received a strip into alignment with the blade 288 which is then elevated. A subsequent downward movement of the blade 288 causes the strip to be compressed against the windings in the slot and causes the peripheral core tooth insulation to be partially broken away as shown in Fig. 26.

It will be observed that the strip P is severed by movement of the blade 278 in a direction radially of the slot and coincidental with the longer cross sectional dimension of the strip. In order to sever the strip P in this manner without permitting it to buckle, means have been provided for compressing the strip just above the blade 310. The strip is compressed against a portion of the sleeve 45 by a finger 311 provided on the end of a lever 312, pivoted at 313 on a bracket 314 having an extension 315 provided with a lug 316. Lug 316 has a recess 317 for receiving a spring 318 seating in a recess 319 provided by the lever 312. Lever 312 has a cam follower surface 320 engaged by a cam 321 carried by the slide 276. The cam 321 is shaped so that the strip P will be compressed by the finger 311 during the first portion of the downward stroke of the slide 276. Compression of the strip P takes place before it is engaged by the blade 278. By maintaining the strip P in compressed condition, the shearing of the strip by movement of a shear blade in the direction parallel to the longer cross sectional dimension of the strip is facilitated.

*Clutch and clutch control*

Figure 19:
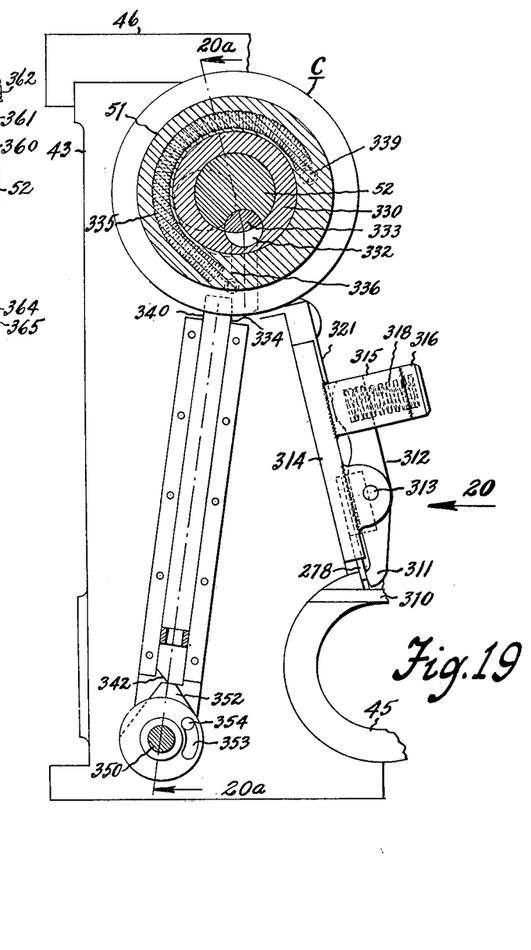
Fig. 19 is a fragmentary view similar to Fig. 18 showing certain operating parts in the normal or home position.
Figure 20:
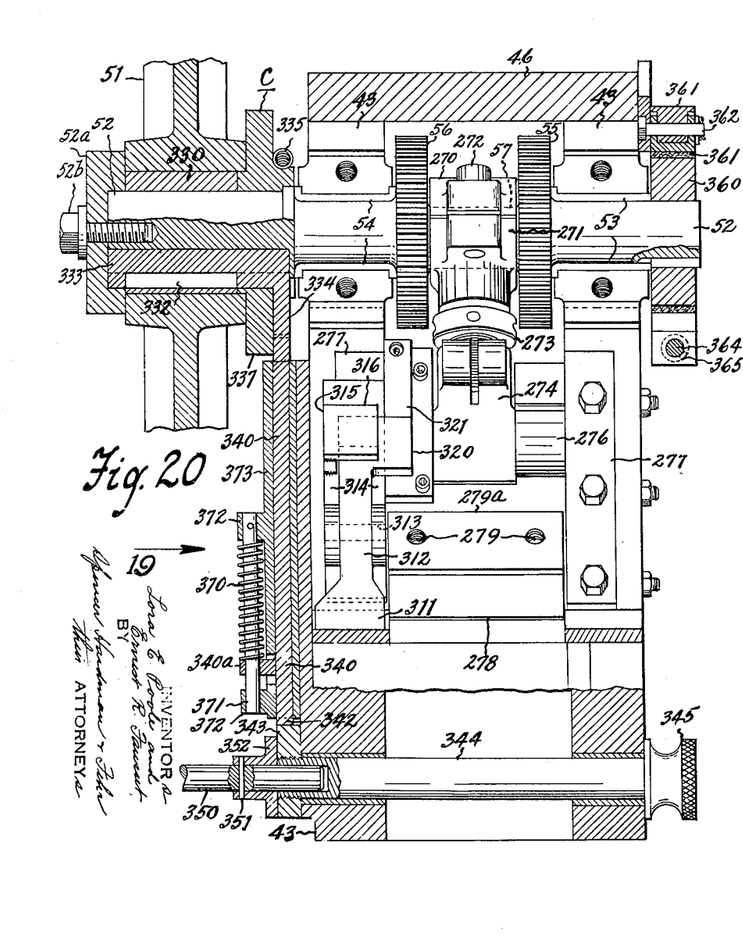
Fig. 20 is a fragmentary sectional view on the line 20—20 and on line 20a—20a of Fig. 19 showing certain parts in home position.

The clutch C will now be described in detail with reference to Figs. 18, 19, 20 and 22. The hub of gear 51 provides a bearing sleeve 330 to which the gear 51 is attached by a key 331. Shaft 52 and sleeve 330 are provided with mating recesses which it appears in Figs. 18 and 19 provide a round hole 332 for receiving a cross pin 333. Pin 333 is integral with an arm 334 urged by an helical coil spring 335 against a stop shoulder 336 provided by a collar 337 which is fastened to shaft 52 by key 338 (see Fig. 22). Spring 335 is attached at one end to the arm 334 and at the other end to a stud 339 provided by the collar 337. As shown in Fig. 18, the arm 334, when urged by the spring 335 against the stop 336, so locates the pin 333 that it connects together the shaft 52 and the sleeve 330, thereby connecting the gear 51 with shaft 52. In Fig. 19 the pin 333 is shown in such position that the gear 51 and its sleeve 330 are disconnected from shaft 52. Sleeve 330 and gear 51 are retained on the shaft 52 by a washer 52a and a nut 52b.

Figure 2:
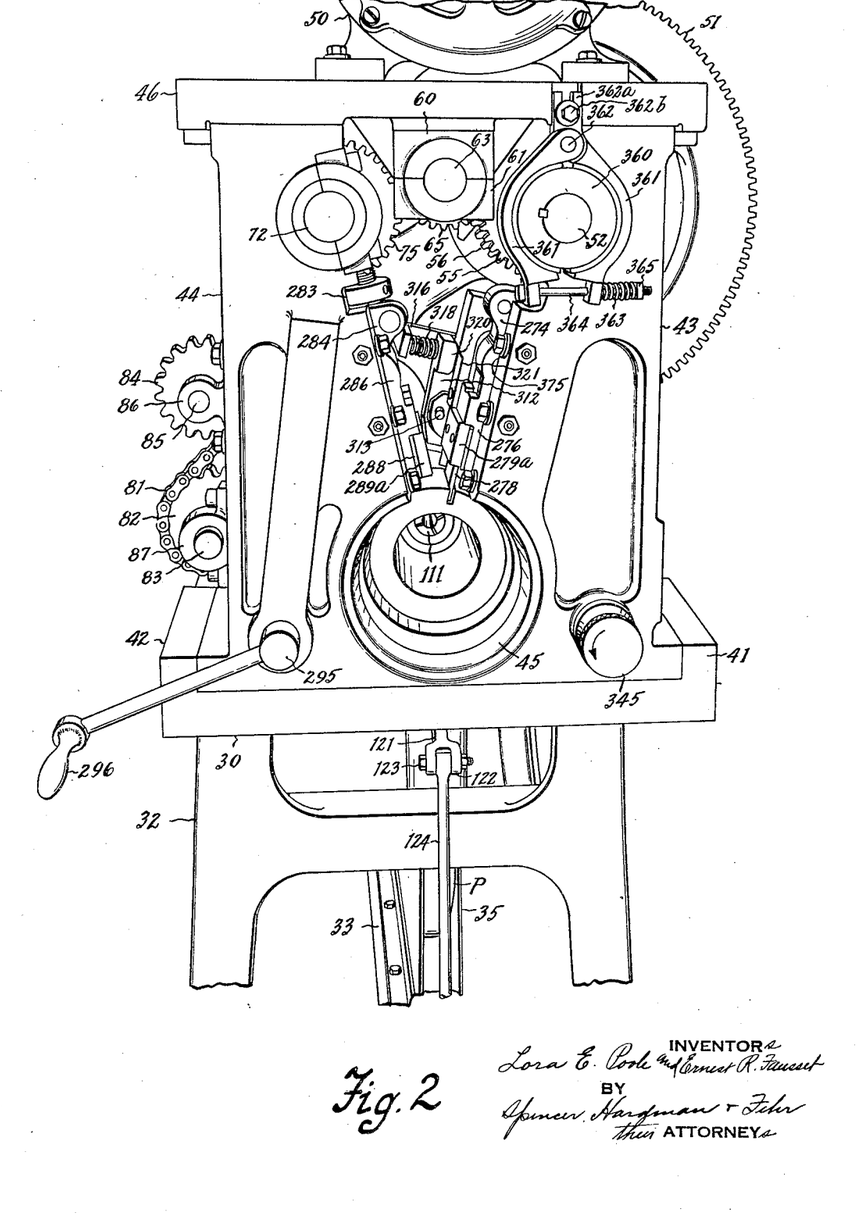
Fig. 2 is a fragmentary perspective view of the front of the machine on a larger scale than Fig. 1.

Pin 333 is caused to be located in this position as a result of the arm 334 striking a bar 340 which is slidable in a groove 341 provided by the pedestal 43. The bar 340 terminates at its lower end at a cam follower 342 engageable with a cam 343 connected with a sleeve 344 which terminates in a handle or knob 345 located in front of the machine (see Fig. 2). The sleeve 344 is journalled in bearings provided by the pedestal bracket 43 and it supports a shaft 350 to which a pin 351 secures a disc 352 provided with an arcuate slot 353 and receiving a pin 354 attached to the cam 343.

Referring to Figs. 4, 5 and 6, shaft 350 is supported by an extension 355 of bearing bracket 214. Shaft 212, which operates the lifter cams 215 and 216, drives a beveled gear 356 meshing with a beveled gear 357 pinned to shaft 350. As stated before, the shaft 212 is so geared to shaft 83 that the former makes one complete revolution for fifteen reciprocations of the crank shaft 52. It will be understood that the number of these reciprocations depends on the number of slots in the armature core, this number being equal to N (the number of core slots) plus one. The armature illustrated in Fig. 18 requires fourteen reciprocations of the crank shaft 52 to insert fourteen strips P in the fourteen armature slots and then one additional reciprocation is required in order that the last slot to receive a strip P will be indexed one additional increment to bring it into alignment with the blade 288 which partially breaks away the peripheral insulation of the core. Therefore, it is apparent that the shaft 350 must rotate once while the crank shafts 52 and 72 make 15 reciprocations.

Fig. 18 shows the condition of the shaft and the disc 352 driven thereby toward the end of the cycle of operation of the machine. As the disc 352 rotates clockwise, it causes the pin 354 and the cam 343 to rotate clockwise. It will be seen that cam 343 is about to engage the follower 342 on the end of clutch throw-out bar 340. As the cam 343 rotates from the position shown in Fig. 18 to that shown in Fig. 19, the bar 343 is lifted so that it will engage the arm 334 of clutch pin 333 as shown in Fig. 19, thereby bringing the intermediate cross hatched portion of pin 333 (see (Fig. 19) in such position as to free the sleeve 330 from the shaft 52, whereupon the gear 51 may rotate while the cranks are at rest.

In order that the cranks 57 and 77 will be promptly brought to rest, the shaft 52 is keyed with a brake drum 360 engaged by brake shoes 361 supported on a pin 362 which is carried by bracket 362a attached adjustably to table 46 by a screw 362b urged toward the drum 360 by a spring 363 which surrounds a bolt 364 passing through ears of the shoes and receiving a nut 365 by which tension of the spring 363 may be adjusted in order to vary the application of braking pressure to the drum 360.

At the end of a cycle of operation of the machine, the pedal 130 is depressed to release the armature shaft S from the chuck 111, the armature assembly operated upon is removed and incomplete armature assembly is inserted in its place. While the new assembly is being located in the sleeve 45 by the blade 294 (Fig. 24), the handle 296 (Fig. 2) having been turned for this purpose, the pedal 130 is released to permit the chuck 111 to grip the shaft S of this new assembly. Then the machine is started again by rotating the knob 345 counterclockwise as viewed in Fig. 1 and clockwise as viewed in Fig. 19. It will be noted that the arcuate slot 353 in the disc 352 provides sufficient clearance for the pin 354 so that the cam 343 may be manually turned out of engagement with the cam follower 342, whereupon the bar 340 returns to the position shown in Fig. 18 by gravity and by the action of a spring 370 which surrounds a rod 371 carried by lugs 372 integral with a cover plate 373 which includes the groove in which the bar 340 is slidable. The spring 370 is confined between the upper lug 372 and a lug 340a integral with the slide 340.

Figure 27:
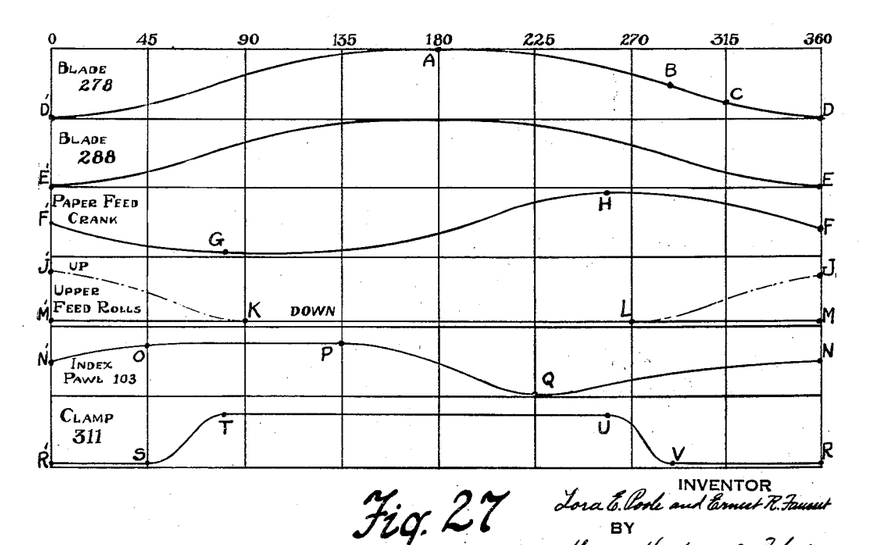
Fig. 27 is a diagram of movements of certain parts of the machine.

Fig. 27 shows diagrammatically the movements of certain operating parts and is based on one revolution of the cranks 57 and 77 from down position. Curve D'—D represents movement of blade 278 and curve E'—E represents movement of blade 288.

Figure 25:
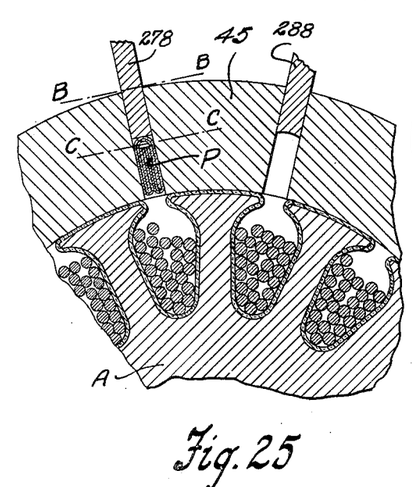
Figs. 25 and 26 are enlarged scale sectional views of the armature assembly and certain parts of the machine in different positions of operation.
Figure 26:
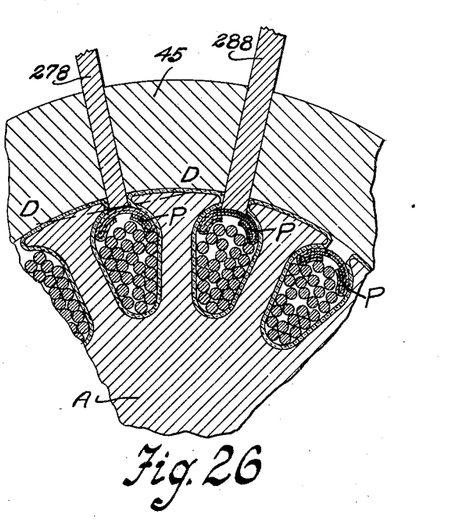

The curve D'—D contains points A, B, C and D corresponding respectively to lines A—A, B—B, C—C and D—D of Fig. 25. Point A on the curve and line A—A of Fig. 25 represent the uppermost position of the blade 278. Point B and line B—B indicates where the blade 278 begins shearing the folded paper strips P. At point C of Fig. 27 and at line C—C of Fig. 25, the strip P begins to enter the core slot. At point D and at line D—D, which represents the lowermost position of the blade 278, the strip P has been placed in the core slot.

From G to H on curve F'—F the paper strips P are being folded and fed to a position adjacent the armature core.

During 14 of the 15 cycles of the machine the feed rolls drivingly engage the paper as indicated by line M'—M. Toward the end of the 14th cycle the feed rolls are relieved of driving engagement with the paper by raising the upper feed rolls as indicated by line L—J. During the first 90° of the first cycle the upper feed rolls are lowered as indicated by line J'—K. The 90° line represents where the machine comes to rest at the end of the 15th cycle.

Curve N'—N represents operations of the armature indexing pawl 103. Between P and Q on curve N'—N the armature is indexed. Between Q and N and between N' and O the pawl 103 is retracted. Between O and P the pawl 103 is advanced before engaging the ratchet 105 (Fig. 8).

Curve R'—R represents the action of the paper clamping finger 311 (Fig. 18). Between T and U the finger 311 is fully retracted. Between U (corresponding to H on curve F'—F) and V (corresponding to B on curve D'—D) the finger 311 is advanced to clamp the strips P. Between V and R and between R' and S the strips P are confined by the finger 311 while the blade 278 is operating to push the strips P into a core slot. The clamping pressure afforded by the finger 311 is not so great as to prevent this movement of the strips P. Between S and T, the finger 311 is being retracted.

While the embodiment of the present invention as herein disclosed, constitutes a preferred form, it is to be understood that other forms might be adopted, all coming within the scope of the claims which follow.

What is claimed is as follows:

1. A machine for manufacturing dynamo armatures comprising a workholder for rotatively supporting a slotted armature core assembled with windings which retain in the core slots nonconducting linings of sheet insulating material which surrounds the core teeth; means for intermittently rotarily indexing the core by increments equal to the angular opening of the core slots; means operative during rotation of the core for intermittently feeding a folded body of insulating material longitudinally with respect to the core and of such thickness as to pass into the core slot between adjacent core teeth overlaid with sheet insulating material to a location in radial alignment with a core slot; two reciprocating blades movable radially into adjacent core slots, one blade operable to insert the body into a core slot, the other blade operable to press said body against the windings in the slot causing the folded body to spread laterally over the windings to seal the entrance of the slot and also to compress the strip of insulation overlying the core teeth against the core teeth to such extent as to weaken materially said strip insulation where it is bent around the edges of the core teeth in order to facilitate removal from slot lining portions those portions which overlie the peripheries of the core teeth; and means for moving said blades into the core slots while the core indexing means and the body feeding means are at rest.

2. A machine according to claim 1 and having a power drive and an automatic clutch throw out which cause the machine to stop after N and 1 reciprocations of the blades plus having means for causing the feeding means to cease after N reciprocations of the blades, N being equal to the number of coil slots.

3. A machine according to claim 1 in which the feeding means includes mechanically driven rolls engaging bodies, and having a power driven and an automatic clutch-throwout which causes the machine to stop after N+1 reciprocations of the blades, and having means for causing the rolls to become relieved of driving engagement with bodies after N reciprocations of the blades so that no body will be fed during (N+1) the reciprocation, N being equal to the number of core slots.

4. A machine for manufacturing dynamo armatures comprising a workholder for rotatively supporting a slotted armature core assembled with windings which retain in the core slot nonconducting linings of sheet insulating material which surrounds the core teeth; means for intermittently rotarily indexing the core by steps equal to the angular spacing of the core slots; means for supplying folded lengths of insulating material of such thickness as to pass into a core slot between adjacent core teeth overlaid with sheet insulating material; means for positioning a folded length in radial alignment with a core slot; a pair of reciprocating blades movable radially into adjacent core slots, one blade operable to insert the length into a core slot, the other blade being operable to press the length against the windings in the slot causing the strip to spread laterally over the winding to seal the throat and also to compress the strip of insulation overlying the core teeth to such extent as to weaken materially said strip insulation where it is bent around the edges of the core teeth in order to facilitate removal from slot lining portions those portions which overlie the peripheries of the core teeth; and means for moving the blades into the core slots while the core indexing means and the folded length positioning means are at rest.

LORA E. POOLE.
E. R. FAUSSET.